US008879138B2

(12) United States Patent
Suh et al.

(10) Patent No.: US 8,879,138 B2
(45) Date of Patent: Nov. 4, 2014

(54) SURFACE PLASMON POLARITON MODULATOR

(71) Applicant: Samsung Electronics Co., Ltd., Suwon-si (KR)

(72) Inventors: Hwansoo Suh, Gunpo-si (KR); Chang-won Lee, Seoul (KR); Yeon-sang Park, Seoul (KR); Jineun Kim, Gwangju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 118 days.

(21) Appl. No.: 13/741,894

(22) Filed: Jan. 15, 2013

(65) Prior Publication Data

US 2013/0148186 A1 Jun. 13, 2013

Related U.S. Application Data

(62) Division of application No. 13/090,453, filed on Apr. 20, 2011, now Pat. No. 8,379,287.

(30) Foreign Application Priority Data

Sep. 3, 2010 (KR) .................. 10-2010-0086587

(51) Int. Cl.
G02F 1/01 (2006.01)
G02F 1/09 (2006.01)
G02F 1/11 (2006.01)
G02F 1/29 (2006.01)
G02F 1/035 (2006.01)
G02F 1/00 (2006.01)
G02B 6/122 (2006.01)

(52) U.S. Cl.
CPC .. G02F 1/00 (2013.01); G02F 1/29 (2013.01); G02F 1/035 (2013.01); G02F 1/01 (2013.01); G02F 2203/10 (2013.01); G02B 6/1226 (2013.01)
USPC .............................. 359/240; 359/280; 359/285

(58) Field of Classification Search
CPC ............ G02F 1/00; G02F 1/01; G02F 1/035; G02F 1/29; G02F 2203/10; G02B 6/1226
USPC ......................................... 359/240, 280, 285
See application file for complete search history.

(56) References Cited

U.S. PATENT DOCUMENTS

| 6,278,540 B1 | 8/2001 | Wang |
| 2007/0292080 A1 | 12/2007 | Hyde et al. |
| 2008/0219628 A1* | 9/2008 | Podolskiy et al. ............ 385/123 |

FOREIGN PATENT DOCUMENTS

| JP | 5-129388 A | 5/1993 |
| JP | 5-313108 A | 11/1993 |

(Continued)

OTHER PUBLICATIONS

Neutens, P., et al., "Electrical detection of confined gap plasmons in metal-insulator-metal waveguides", Nature Photonics, May 2009, pp. 283-286, vol. 3.

(Continued)

*Primary Examiner* — William Choi
(74) *Attorney, Agent, or Firm* — Sughrue Mion, PLLC

(57) ABSTRACT

A surface plasmon polariton modulator capable of locally varying a physical property of a dielectric material to control a surface plasmon polariton. The surface plasmon polariton modulator includes a dielectric layer, including first and second dielectric portions, which is interposed between two metal layers. The second dielectric portion has a refractive index which varies with an electric field, a magnetic field, heat, a sound wave, or a chemical and/or biological operation applied thereto. The surface plasmon polariton modulator is configured to control one of an advancing direction, an intensity, a phase, or the like of a surface plasmon using an electric signal. The surface plasmon polariton modulator can operate as a surface plasmon polariton multiplexer or a surface plasmon polariton demultiplexer.

5 Claims, 5 Drawing Sheets

(56) References Cited

FOREIGN PATENT DOCUMENTS

| | | |
|---|---|---|
| JP | 6-85368 A | 3/1994 |
| KR | 10-2009-0093427 A | 9/2009 |

OTHER PUBLICATIONS

Walters, R. J., et al., "A silicon-based electrical source of surface plasmon polaritons", Nature Materials, Jan. 2010, pp. 21-25, vol. 9.

* cited by examiner

SURFACE PLASMON POLARITON MODULATOR

CROSS-REFERENCE TO RELATED APPLICATION

This application is a divisional of U.S. Ser. No. 13/090,453, filed Apr. 20, 2011, which application claims priority from Korean Patent Application No. 10-2010-0086587, filed on Sep. 3, 2010, in the Korean Intellectual Property Office, the disclosures of which are incorporated herein by reference.

BACKGROUND OF THE INVENTION

1. Field

Apparatuses consistent with exemplary embodiments relate to a surface plasmon polariton modulator, and more particularly, to a surface plasmon polariton modulator capable of locally varying a physical property of a dielectric material to control a surface plasmon polariton.

2. Description of the Related Art

A charge-density oscillation at an interface between a metal layer and a dielectric layer is referred to as a surface plasmon polariton or simply a surface plasmon. Since the surface plasmon has a fast propagation velocity that is approximate to a velocity of light and has a high frequency reaching infrared rays, visible rays, and ultraviolet rays, the surface plasmon is appropriate for high-bandwidth communications.

A wavelength of light of about $10^2$ nm to about $10^3$ nm, used in optical elements, is much greater than a size of an element of a high-integration electronic circuit. Therefore, integration is reduced in an optoelectronic integrated circuits (OEICs), which uses light without wavelength conversion, due to the relatively long wavelength. A surface plasmon may have a shorter wavelength than an electromagnetic wave having the same frequency. Thus, since an OEIC may be realized using the above-stated property of surface plasmons, surface plasmons have attracted much attention in this field.

Optical methods are used to generate a surface plasmon. For example, when a thin metal film is coated on a dielectric having a refractive index greater than 1 and light illuminates the thin metal film through the dielectric at a particular angle, a surface plasmon having a particular frequency can be strongly and resonantly generated. According to another method of generating a surface plasmon, a diffraction grating, a hole, a crack, or a groove is formed in a smooth metal surface, and then light illuminates the smooth metal surface. However, the above-described methods use light to generate the surface plasmon and thus require an additional external light sources. Therefore, the method is not appropriate for use on an integrated circuit. A method of electrically generating a surface plasmon based on silicon nanoparticles and a method of electrically sensing a surface plasmon have been introduced.

A technique for converting an electric signal into a surface plasmon and a technique for converting a surface plasmon into an electric signal are the most basic elements in a surface plasmon-based OEIC technique. However, a technique for controlling a surface plasmon using an electric signal is further required to realize an OEIC based on the surface plasmon. For example, a surface plasmon polariton modulator may be a basic component of a plasmon-based optical part and may be applied as a surface plasmon-based optical modulator, a basic element of an OEIC technique, or the like.

SUMMARY

The following description relates to a surface plasmon polariton modulator capable of controlling a traveling direction, an intensity, a phase, and the like of a surface plasmon using an electric signal.

Additional exemplary aspects will be set forth in part in the description which follows and, in part, will be apparent from the description, or may be learned by practice of the presented exemplary embodiments.

According to an aspect of an exemplary embodiment, a surface plasmon polariton modulator includes: first and second metal layers which are opposite to each other; and a dielectric layer interposed between the first and second metal layers, the dielectric layer including first and second dielectric portions, wherein the first and second dielectric portions are alternately disposed along a traveling direction of a surface plasmon on a plane formed between the first and second metal layers, and the first and second dielectric portions are configured such that a surface plasmon incident on the dielectric layer travels along an interface between the first metal layer and the dielectric layer on an interface between the second metal layer and the dielectric layer.

The second dielectric portion may have a refractive index which varies with an electric field generated between the first and second metal layers, and the first and second metal layers are electrodes which apply the electric field to the second dielectric portion.

The second dielectric portion may have a surface which is inclined to an initial traveling axis of the incident surface plasmon.

The surface plasmon polariton modulator may further include a sound wave generator which is disposed on the second dielectric portion between first and second parts of the second metal layer.

The second metal layer may comprise an opening therein corresponding to the second dielectric portion, and the sound wave generator may be disposed in the opening, on the second dielectric layer.

The sound wave generator may be disposed on the second dielectric layer and a shape of the sound wave generator may be the same as the shape of the second dielectric layer.

The second dielectric layer may have a refractive index which varies with a sound wave generated by the sound wave generator.

The surface plasmon polariton modulator may further include: first and second magnetic layers which are respectively disposed on lower and upper surfaces of the second dielectric portion; and a magnetic field applying apparatus which is disposed under the second dielectric portion.

Shapes of the first and second magnetic layers may be the same as a shape of the second dielectric portion.

The second magnetic layer may be disposed between the second dielectric portion and the second metal layer, and the first metal layer may have an opening therein corresponding to the second dielectric portion, and the first magnetic layer may be disposed in the opening, under the second dielectric portion.

The second dielectric layer may have a refractive index which varies with a magnetic field generated by the magnetic field applying apparatus The second metal layer may have an opening therein corresponding to the second dielectric portion, and the surface plasmon polariton modulator may further include a compound bonding layer which is disposed in the opening, on the second dielectric layer.

The compound bonding layer may further include a target chemical and/or biological specimen, and a refractive index of a combined layer, including the compound bonding layer and the second dielectric portion, may vary according to a concentration of the target chemical and/or biological specimen.

The surface plasmon polariton modulator may further include a sensor array which is disposed on a surface plasmon emission surface of the dielectric layer.

The surface plasmon polariton modulator may be configured to operate as a scanner which scans a surface plasmon within a predetermined angle, a multiplexer which multiplexes an incident surface plasmon to one path selected from a plurality of paths, a demultiplexer which integrates surface plasmons incident from several paths into one path, or a modulator which modulates an intensity of a surface plasmon output signal.

According to an aspect of another exemplary embodiment, a surface plasmon polariton modulator includes: a metal rod extending in a first direction; first and second dielectric portions which surround the metal rod, wherein the first and second dielectric portions alternate along the first direction; and first and second electrodes which are disposed on opposite sides of the second dielectric portion, wherein the first and second dielectric portions are configured such that a surface plasmon incident on one of the first and second dielectric portions travels along an interface between the first and second dielectric portions and the metal rod.

Wherein the second dielectric portions has a refractive index which varies with an electric field is applied to the second dielectric portion through the first and second electrodes.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION

Figure 1:
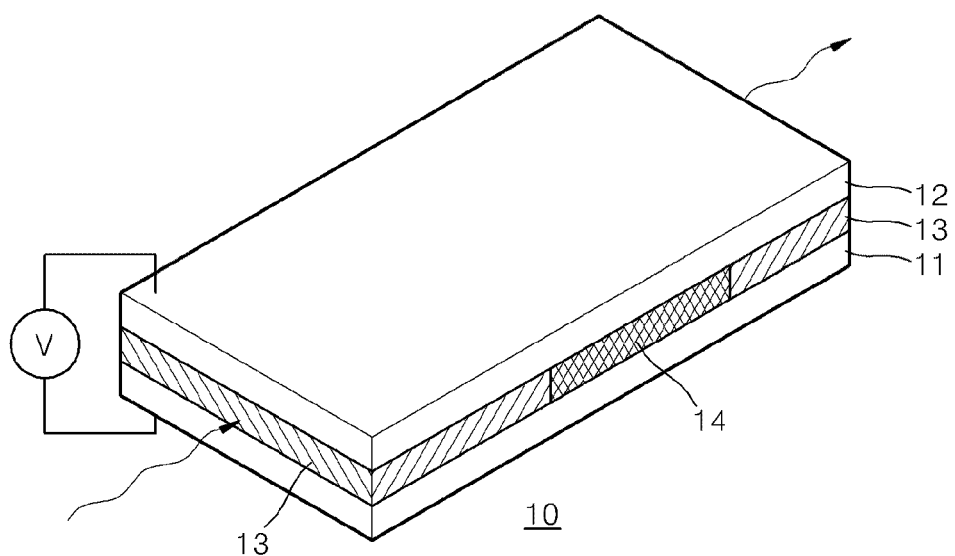
FIG. 1 is a schematic perspective view illustrating a structure of a surface plasmon polariton modulator according to an exemplary embodiment.

Reference will now be made in detail to exemplary embodiments, examples of which are illustrated in the accompanying drawings, wherein like reference numerals refer to like elements throughout. In this regard, the exemplary embodiments may have different forms and should not be construed as being limited to the descriptions set forth herein. Accordingly, embodiments are merely described below, by referring to the figures, to explain aspects of the present description.

FIG. 1 is a schematic perspective view illustrating a structure of a surface plasmon polariton modulator 10 according to an exemplary embodiment. Referring to FIG. 1, the surface plasmon polariton modulator 10 includes first and second metal layers 11 and 12 and a dielectric layer including first and second dielectric portions 13 and 14. The first and second metal layers 11 and 12 are opposite to each other, and the first and second dielectric portions 13 and 14 are interposed between the first and second metal layers 11 and 12. According to the present embodiment, a surface plasmon is generated by an external surface plasmon generating apparatus (not shown) using an optical or electric method and travels along an interface between the first metal layer 11 and the first and second dielectric portions 13 and 14 or an interface between the second metal layer 12 and the first and second dielectric portions 13 and 14. For example, in FIG. 1, the surface plasmon is incident from a left side of the surface plasmon polariton modulator 10 and then is emitted from a right side of the surface plasmon polariton modulator 10.

The first and second metal layers 11 and 12 may be formed of a metallic material such as a metal which easily generates a surface plasmon. For example, the first and second metal layers 11 and 12 may be formed of a metallic material selected from the group consisting of gold (Au), silver (Ag), etc. Also, the first and second metal layers 11 and 12 may be formed of a metal selected from the group consisting of copper (Cu), lead (Pb), indium (In), tin (Sn), cadmium (Ca), etc. The first and second metal layers 11 and 12 define a path in which the surface plasmon travel but also serve as electrodes which are connected to a power supply source to apply an electric field to the first and second dielectric portions 13 and 14, as shown in FIG. 1.

The first and second dielectric portions 13 and 14 are consecutively disposed along the path of the surface plasmon on the same plane formed between the first and second metal layers 11 and 12. For example, in FIG. 2, the first and second portions 13 and 14 are disposed in the dielectric layer in the order of the first dielectric portion 13, the second dielectric portion 14, and the first dielectric portion 13 along the path of the surface plasmon. However, according to another exemplary embodiment, the second dielectric portion 14 may be disposed on an incidence side or an emission side of the path. In other words, the second dielectric portion 14 may be disposed in an arbitrary area between the first and second metal layers 11 and 12, and the first dielectric portion 13 may be disposed in another area between the first and second metal layers 11 and 12.

According to an exemplary embodiment, the first dielectric portion 13 may be formed of a dielectric material having a refractive index which is approximately constant regardless of whether a voltage is applied to the first and second metal layers 11 and 12. In other words, the refractive index of the first dielectric portion 13 hardly varies based on the presence or absence of an electric field generated between the first and second metal layers 11 and 12. For example, the first dielectric portion 13 may be formed of silicon dioxide ($SiO_2$) or silicon nitride ($SiN_x$). The second dielectric portion 14 may be formed of a dielectric material having a refractive index which varies due to the electric field generated between the first and second metal layers 11 and 12. For example, the second dielectric portion 14 may be formed of a liquid crystal, a Mott insulator such as vanadium dioxide ($VO_2$), an electro-active polymer, or an electro-optical crystal such as $LiNbO_x$.

Figure 2:
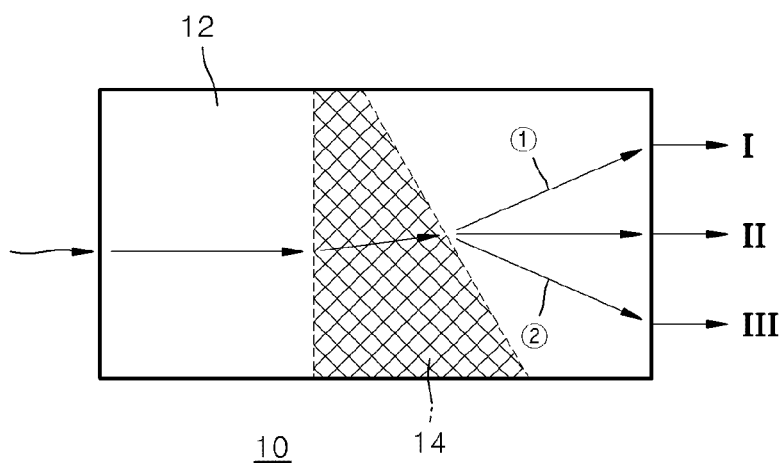
FIG. 2 is a plane view illustrating an operation of the surface plasmon polariton modulator of FIG. 1.

FIG. 2 is a plane view illustrating an operation of the surface plasmon polariton modulator 10 of FIG. 1. In FIG. 2, the second metal layer 12 is shown, and the second dielectric portion 14 under the second metal layer 12 is shown marked with dashed lines. Referring to FIG. 2, a surface plasmon incident from the left side of the surface plasmon polariton modulator 10 travels into an inside of the surface plasmon polariton modulator 10 and is emitted from the right side of the surface plasmon polariton modulator 10. In this process, an intensity, a traveling direction, and the like of the surface plasmon may vary with a variation in the refractive index of the second dielectric portion 14.

In general, when a surface plasmon mode has an angular momentum w and a wave vector k, wherein k=|k| and k̂=k/k, a phase velocity and a group velocity of the surface plasmon mode are respectively expressed as Equations 1 and 2 below:

$$v_p(\omega/k)\hat{k} \quad (1)$$

$$v_g = (d\omega/dk)\hat{k}. \quad (2)$$

The phase velocity represents a movement direction and a speed of a phase front, and the group velocity represents a flow direction of energy (power). In general, directions of the phase velocity and the group velocity are the same. However, if "dω/dk" is less than "0," the directions of the phase velocity and the group velocity are opposite to each other, i.e., a backward wave in which an energy flow is opposite to a movement direction of a phase front may be generated.

Figure 3:
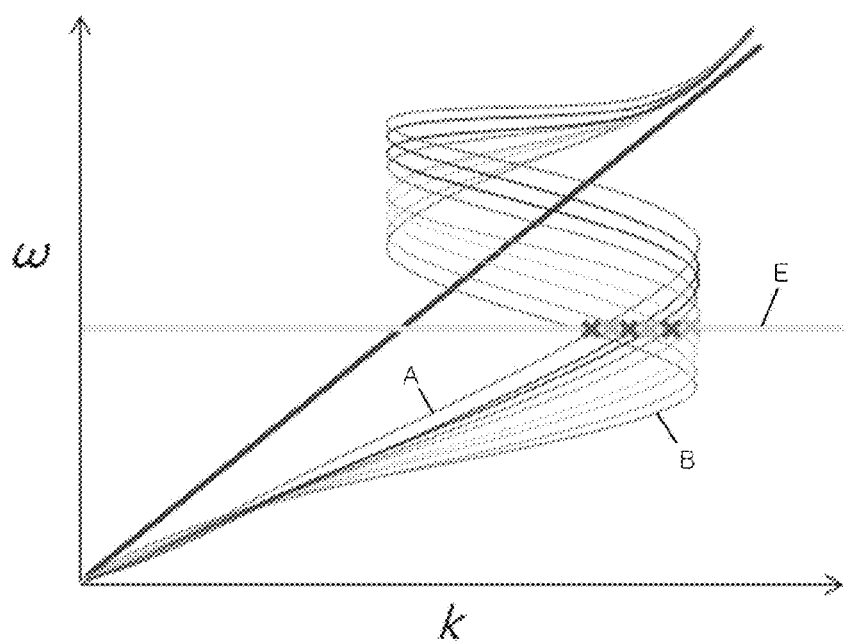
FIG. 3 is a dispersion curve graph illustrating a dispersion relation of surface plasmons traveling along an interface between a dielectric layer and a metal layer, with respect to variations in a refractive index of a dielectric layer.

FIG. 3 is a dispersion curve graph illustrating a dispersion relation of a surface plasmon traveling along an interface between a dielectric layer and a metal layer, with respect to variations in a refractive index of portions of the dielectric layer. An inclined straight line passing through the origin denotes a general dispersion curve of light, and the plurality of curves passing the origin denote dispersion curves of the surface plasmon. As shown in FIG. 3, a relation between an angular momentum ω and a wave vector k of the light is uniform. A relation between an angular momentum ω and a wave vector k of the surface plasmon is represented as complicated curves. A dispersion curve gradually varies with variations in a physical property (e.g., a refractive index) of portions of a dielectric layer. For example, the dispersion curve may vary from a graph A to a graph B according to the physical property of the portions of the dielectric layer.

When referring to Equations 1 and 2, a gradient of a tangent passing one point of the dispersion curve graph denotes the phase velocity of Equation 1, and a variation of a curve at the point denotes the group velocity of Equation 2. A refractive index n related to the surface plasmon propagation is obtained from the phase velocity and the group velocity as Equation 3 below:

$$n = \frac{v_g}{v_g} \cdot \frac{c}{v_p} \quad (3)$$

As shown in FIG. 3, an intersection of the dispersion curve and an equivalent frequency line or an equivalent energy line (E=hω/2π) passing an axial direction of the wave vector k vary from the graph A to the graph B according to the physical property. Since the phase velocity and the group velocity vary at each intersection, the phase velocity and the group velocity of the surface plasmon having a particular energy E vary with the physical property of the dielectric portion. Therefore, the surface plasmon propagation refractive index n can be varied by varying the physical properties of a metal and a dielectric forming the surface plasmon waveguide structure. If the surface plasmon propagation refractive index varies in a partial area of the surface plasmon waveguide structure, a propagation path of the surface plasmon can be changed or a transmissivity, the traveling direction, and/or the like of the surface plasmon may be actively controlled.

Referring to FIG. 2 again, the second dielectric portion 14 having the variable refractive index is disposed only in a partial area within the surface plasmon polariton modulator 10. Therefore, if the refractive index of the second dielectric portion 14 varies, the propagation path of the surface plasmon may vary or the transmissivity, the traveling direction, and/or the like of the surface plasmon may be controlled as shown in FIG. 2. The incident surface plasmon is refracted to travel along one of three paths I, II, and III. For example, the incident surface plasmon may travel along one of the three paths I, II, and III according to the voltage applied to the first and second metal layers 11 and 12. The second dielectric portion 14 may have a trapezoidal shape with an inclined surface as shown in FIG. 2, in order to refract the surface plasmon at a predetermined angle. Alternatively, the second dielectric portion 14 may be formed in any shape having a surface inclined with respect to an initial traveling axis of the surface plasmon, like a triangle, an equilateral triangle, an isosceles triangle, or another trapezoidal shape. In this case, if "dω/dk" of the surface plasmon is greater than "0" on the dispersion curve of FIG. 3, the surface plasmon may be refracted in one direction. If "dω/dk" of the surface plasmon is less than "0," the surface plasmon may be refracted in an opposite direction.

The surface plasmon polariton modulator 10 having the above-described structure and performing the above-described operation may be applied in various forms. For example, if a sine wave or cosine wave voltage having a constant period is applied to the first and second metal layers 11 and 12, the surface plasmon polariton modulator 10 may operate as a scanner for scanning a surface plasmon through a predetermined angle. If one of a plurality of preset voltages is selectively applied to the first and second metal layers 11 and 12, the surface plasmon polariton modulator 10 may operate as a multiplexer for multiplexing a surface plasmon through one path selected from a plurality of paths. If the surface plasmon travels in an opposite direction (i.e., the surface plasmon travels from the right side to the left side), the surface plasmon polariton modulator 10 may operate as a demultiplexer for integrating surface plasmons from several paths into one path. Also, the intensity of the surface plasmon refracted at the particular angle increases or decreases according to the voltage applied to the first and second metal layers 11 and 12. Thus, the surface plasmon polariton modulator 10 may operate as a modulator for controlling an intensity of a surface plasmon output signal.

The surface plasmon polarition modulator 10 of FIG. 1 varies the physical property (i.e., the refractive index) of portions of the dielectric layer using an electric method but may vary the physical property of the portions of the dielectric layer using various methods.

Figure 4:
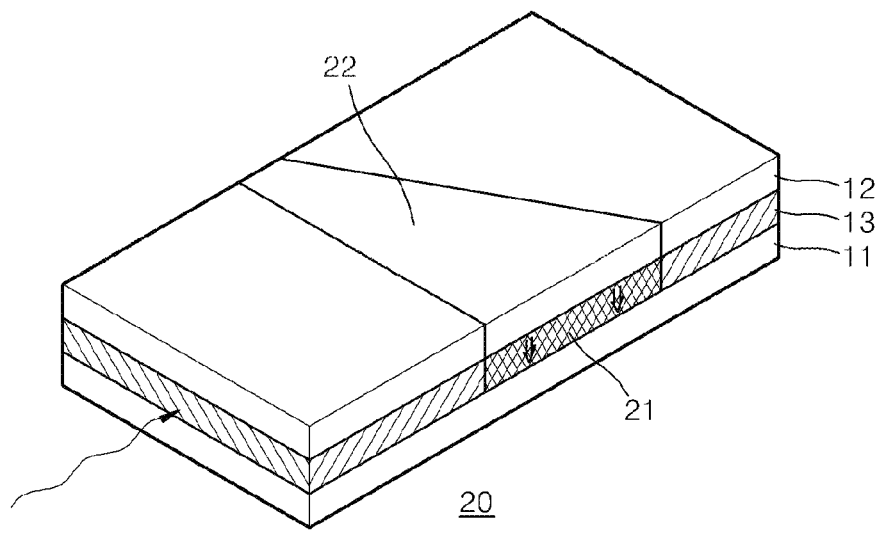
FIG. 4 is a schematic perspective view illustrating a structure of a surface plasmon polariton modulator according to another exemplary embodiment.

FIG. 4 is a schematic perspective view illustrating a structure of a surface plasmon polariton modulator 20 according to another exemplary embodiment. Referring to FIG. 4, the surface plasmon polariton modulator 20 includes first and second metal layers 11 and 12, a dielectric layer including first and second dielectric portions 13 and 21, and a sound wave generator 22. The first and second metal layers 11 and 12 are opposite to each other. The first and second dielectric portions 13 and 21 are interposed between the first and second metal layers 11 and 12. The sound wave generator 22 is disposed on the second dielectric portion 21 between parts of the second metal layer 12. As in the previous embodiment of FIG. 1, the first and second dielectric portions 13 and 21 are consecutively disposed along a traveling direction of a surface plasmon on the same plane formed between the first and second metal layers 11 and 12. The second dielectric portion 21 may have a surface inclined to an initial traveling axis of the surface plasmon to refract the surface plasmon. The sound wave generator 22 is disposed on the second dielectric portion 21 in the same shape as the second dielectric portion 21. Thus, a partial area of the second metal layer 12 on the second dielectric portion 21, corresponding to the second dielectric portion 21, is absent, and then the sound wave generator 22 is disposed in the area. Therefore, the sound wave generator 22 is disposed on the same plane on which the second metal layer 12 is disposed.

In this structure, the first dielectric portion 13 may be formed of a material such as silicon dioxide ($SiO_2$) or silicon nitride ($SiN_x$), wherein the material has a constant refractive index regardless of an external environment. Meanwhile, in the case of the second dielectric portion 21, a sound wave generated by the sound wave generator 22 is transmitted to the second dielectric portion 21 to change a density and a refractive index thereof. The second dielectric portion 21 may be formed of a material, e.g., a piezooptic material or the like such as $LiNbO_x$ or $LiGe_xO_y$, wherein the material has a refractive index that varies with a variation in pressure due to a sound wave. Therefore, the surface plasmon polariton modulator 20 may operate as the surface plasmon polariton modulator 10 of FIG. 1. Also, instead of the sound wave generator 22, another mechanical vibrating apparatus may be disposed to vary the density of the second dielectric portion 21.

If a heat source is disposed instead of the sound wave generator 22, and the second dielectric portion 21 may be formed of a material having a refractive index that varies according to temperature, a surface plasmon polariton modulator operating as described above may be provided. In this case, the second dielectric portion 21 may be formed of a material having a thermooptical characteristic, including a mixture in which inorganic nanoparticles such as titanium dioxide ($TiO_2$) are dispersed inside a transparent polymer matrix.

Figure 5:
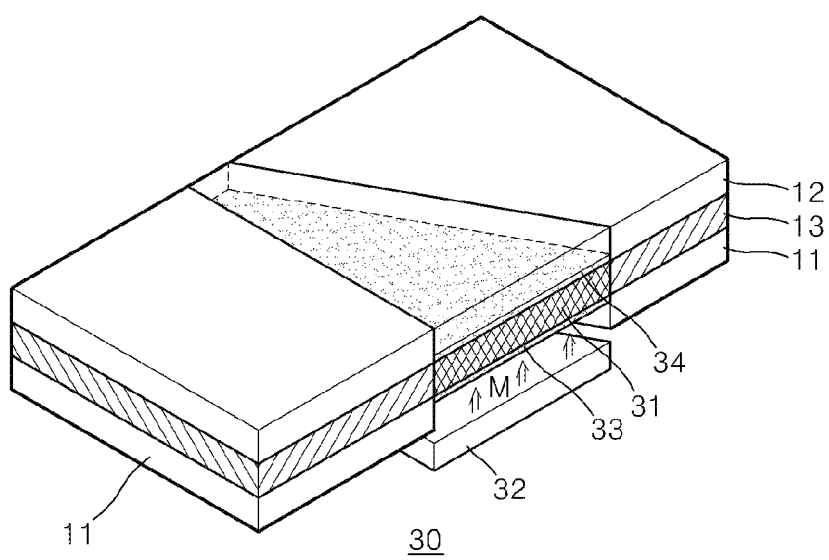
FIG. 5 is a schematic perspective view illustrating a structure of a surface plasmon polariton modulator according to another exemplary embodiment.

FIG. 5 is a schematic perspective view illustrating a structure of a surface plasmon polariton modulator 30 according to another exemplary embodiment. Referring to FIG. 5, the surface plasmon polariton modulator 30 includes first and second metal layers 11 and 12, a dielectric layer including first and second dielectric portions 13 and 31, first and second magnetic layers 33 and 34, and a magnetic field applying apparatus 32. The first and second metal layers 11 and 12 are opposite to each other, and the first and second dielectric portions 13 and 31 are interposed between the first and second metal layers 11 and 12. The first and second magnetic layers 33 and 34 are respectively disposed on lower and upper surfaces of the second dielectric portion 31, and the magnetic field applying apparatus 32 is disposed under the second dielectric portion 31.

As in the previous embodiment of FIG. 1, the first and second dielectric portions 13 and 31 are consecutively disposed along a traveling direction of a surface plasmon on the same plane formed between the first and second metal layers 11 and 12. The second dielectric portion 31 has a surface inclined with respect to an initial traveling axis of the surface plasmon to refract the surface plasmon. Here, the second dielectric portion 31 may be formed of a material having a refractive index that varies based on an applied magnetic field. For example, the second dielectric portion 31 may be formed of a dielectric material mixed with a magneto-optic material such as iron, cobalt, ferrite, bismuth-substituted yttrium iron garnet (Bi:YIG), or the like which exhibits a magneto-optic Kerr effect or a Faraday effect. The first and second magnetic layers 33 and 34 are formed of a material which is easily magnetized by a magnetic field and have the same shapes as the second dielectric portion 31. The second magnetic layer 34 is disposed between the second dielectric portion 31 and the second metal layer 12. A partial area of the first metal layer 11 under the second dielectric portion 31, corresponding to the second dielectric portion 31, is absent, and the first magnetic layer 33 is disposed in this area.

In this structure, the magnetic field applying apparatus 32 disposed under the second dielectric portion 31 generates a magnetic field M toward the second dielectric portion 31. Thus, a refractive index of the second dielectric portion 31 varies based on the magnetic field M. The first and second magnetic layers 33 and 34 further easily transmit the magnetic field M to the second dielectric portion 31. Therefore, the surface plasmon polariton modulator 30 of FIG. 5 may vary an intensity, the traveling direction, and the like of the incident surface plasmon according to an application intensity of the magnetic field M.

Figure 6:
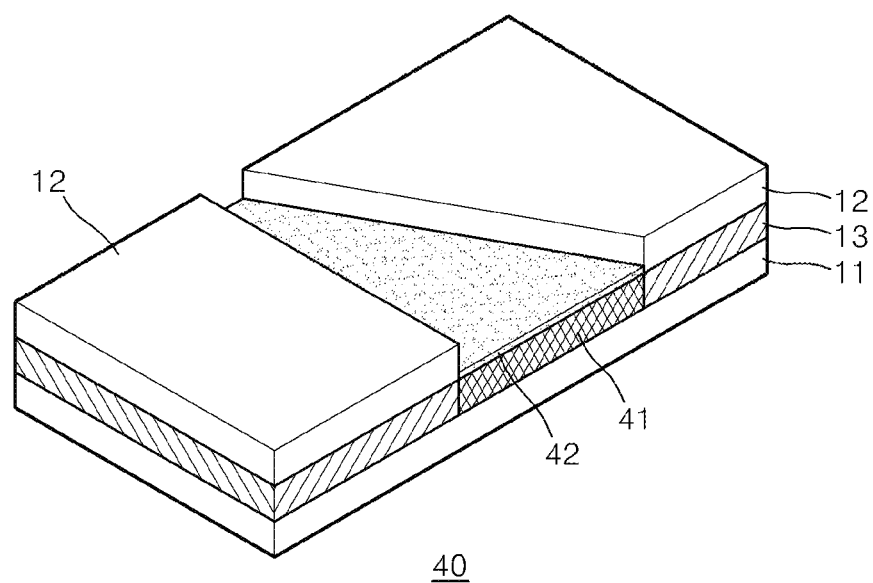
FIG. 6 is a schematic perspective view illustrating a structure of a surface plasmon polariton modulator according to another exemplary embodiment.

FIG. 6 is a schematic perspective view illustrating a structure of a surface plasmon polariton modulator 40 according to another exemplary embodiment of the present invention. Referring to FIG. 6, the surface plasmon polariton modulator 40 includes first and second metal layers 11 and 12, a dielectric layer including first and second dielectric portions 13 and 41, and a compound bonding layer 42. The first and second metal layers 11 and 12 are opposite to each other. The first and second dielectric portions 13 and 41 are interposed between the first and second metal layers 11 and 12. The compound bonding layer 42 is disposed on an upper surface of the second dielectric portion 41. As in the previous embodiment of FIG. 1, the first and second dielectric portions 13 and 41 are consecutively disposed along a traveling direction of a surface plasmon on the same plane formed between the first and second metal layers 11 and 12. The second dielectric portion 41 has a surface inclined with respect to an initial traveling axis of the surface plasmon to refract the surface plasmon. The compound bonding layer 42 is disposed on the second dielectric portion 41 in the same shape as the second dielectric portion 41. Thus, a partial area of the second metal layer 12 located on the second dielectric portion 41 is absent, and the compound bonding layer 42 is disposed in the area.

The compound bonding layer 42 may be formed of a chemical and/or biological material which may be combined with a target chemical and/or biological specimen. If a solution including the target chemical and/or biological specimen is provided on the compound bonding layer 42 in this structure, the compound bonding layer 42 may be combined with the target chemical and/or biological specimen, thereby varying a refractive index of both the compound bonding layer 42 and the second dielectric portion 41. Therefore, the surface plasmon polariton modulator 40 may vary an intensity, the traveling direction, and the like of the incident surface plasmon according to a concentration of the target chemical and/or biological specimen in the solution.

Figure 7:
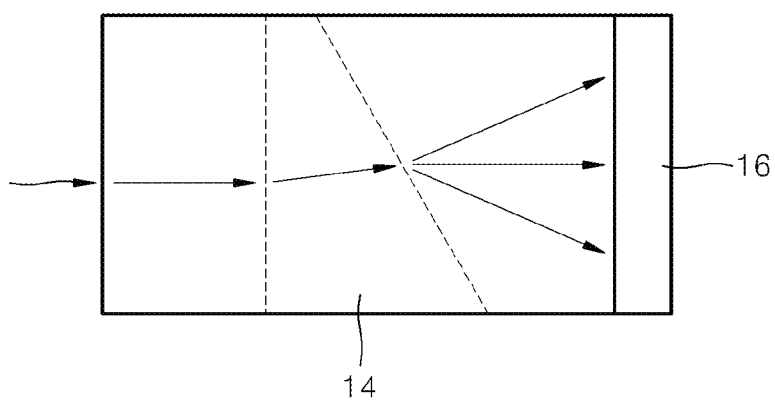
FIG. 7 is a schematic plane view illustrating a sensor array which is disposed on a surface plasmon emission surface of the surface plasmon polariton modulator of FIG. 1 to sense a surface plasmon from the surface plasmon polariton modulator of FIG. 2.

FIG. 7 is a schematic plane view illustrating a sensor array 16 which is disposed on a surface plasmon emission surface of the surface plasmon polariton modulator 10 of FIG. 2 to sense the surface plasmon from the surface plasmon polariton modulator 10. The sensor array 16 may be a photodetector array or a photomultiplier array such as a charge-coupled device (CCD) or a complementary metal oxide semiconductor (CMOS). The sensor array 16 may also be attached onto surface plasmon emission surfaces of the surface plasmon polariton modulators 20, 30, and 40 of FIGS. 4, 5, and 6. If the sensor array 16 is attached onto the surface plasmon emission surface as shown in FIG. 7, the sensor array 16 may sense the refractive indexes of the second dielectric portions 14, 21, 31, and 41 according to a distribution of the surface plasmon sensed by the sensor array 16. Therefore, according to an exemplary embodiment, an electric field, a magnetic field, a vibration, heat, or a concentration of a chemical and/or biological specimen, which varies the refractive indexes of the second dielectric portions 14, 21, 31, and 41, may be observed.

A surface plasmon polariton modulator as described in the above embodiments has a structure in which a dielectric layer is disposed between two metal layers. However, the surface plasmon polariton modulator may have a structure in which a metal layer is disposed between dielectric layers.

Figure 8:
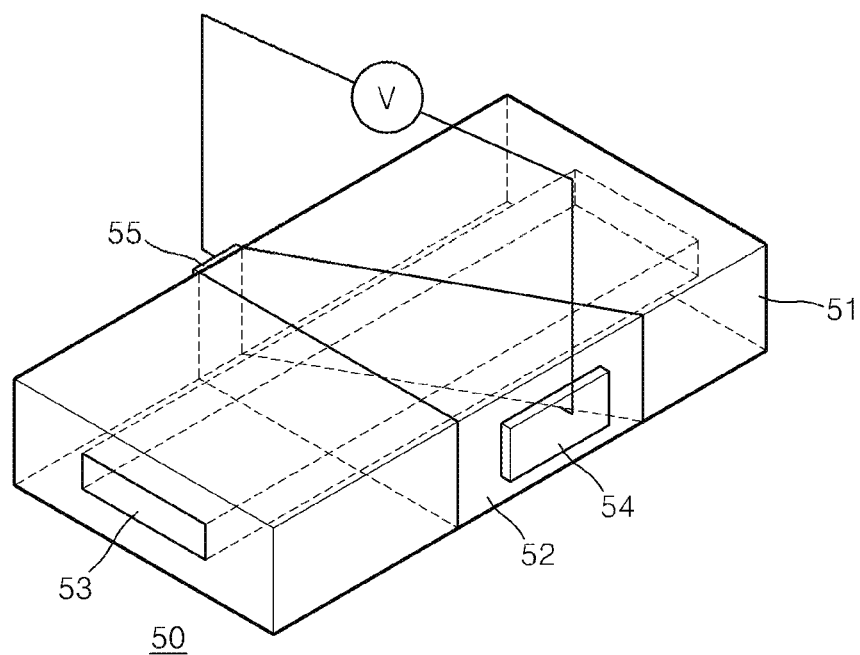
FIG. 8 is a schematic perspective view illustrating a structure of a surface plasmon polariton modulator according to another exemplary embodiment.

FIG. 8 is a schematic perspective view illustrating a structure of a surface plasmon polariton modulator 50 according to another exemplary embodiment. Referring to FIG. 8, the surface plasmon polariton modulator 50 includes a metal layer 53, a dielectric layer including first and second dielectric portions 51 and 52, and first and second electrodes 54 and 55. The metal layer 53 has a rod shape which extends in one direction, the first and second dielectric portions 52 enclose the metal layer 53, and the first and second electrodes 54 and 55 are disposed on both sides of the second dielectric portion 52. The first dielectric portion 51 may be formed of a material having a refractive index that hardly varies based on an electric field, and the second dielectric portion 52 may be formed of a dielectric material having a refractive index that varies based on the electric field. As shown in FIG. 8, the first and second dielectric portions 51 and 52 are consecutively disposed along a traveling direction of a surface plasmon on the same plane with enclosing the metal layer 53. The second dielectric portion 52 has a surface inclined with respect to an initial traveling axis of the surface plasmon to refract the surface plasmon.

In this structure, the surface plasmon is incident onto the surface plasmon polariton modulator 50 and travels along an interface between the first and second dielectric portions 51 and 52 and the metal layer 53. If the electric field is applied to the second dielectric portion 52 through the first and second electrodes 54 and 55, a refractive index of the second dielectric portion 52 varies, thereby varying an intensity, the traveling direction, and the like of the surface plasmon. The refractive index of the second dielectric portion 52 varies by the electric field in FIG. 8 but may vary by a sound wave, a magnetic field, a concentration of a target chemical and/or biological specimen, or the like as described with reference to FIGS. 4-6. The sensor array 16 of FIG. 7 may also be disposed on a surface plasmon emission surface of the surface plasmon polariton modulator 50 of FIG. 8.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A surface plasmon polariton modulator comprising:
   a metal rod extending in a first direction;
   a first dielectric portion and a second dielectric portion which surround the metal rod, wherein the first and second dielectric portions alternate along the first direction; and
   a first electrode and a second electrode which are disposed on opposite sides of the second dielectric portion,
   wherein the first and the second dielectric portions are configured such that a surface plasmon incident on one of the first and the second dielectric portions travels along an interface between the first and the second dielectric portions and the metal rod.

2. The surface plasmon polariton modulator of claim 1, wherein the second dielectric portion has a surface which is inclined with respect to an initial traveling axis of the incident surface plasmon.

3. The surface plasmon polariton modulator of claim 1, wherein the second dielectric portion has a refractive index which varies with an electric field is applied to the second dielectric portion through the first and the second electrodes.

4. The surface plasmon polariton modulator of claim 1, configured to operate as one of:
   a scanner which scans a surface plasmon within a predetermined angle,
   a multiplexer which multiplexes an incident surface plasmon to one path selected from a plurality of paths,
   a demultiplexer which integrates surface plasmons incident from several paths into one path, and
   a modulator which modulates an intensity of a surface plasmon output signal.

5. The surface plasmon polariton modulator of claim 1, further comprising a sensor array which is disposed on a surface plasmon emission surface of one of the first and the second dielectric portions.

* * * * *